US009495885B2

(12) United States Patent
Miller

(10) Patent No.: US 9,495,885 B2
(45) Date of Patent: Nov. 15, 2016

(54) METHOD AND APPARATUS FOR ILLUMINATION AND RECORDING OF INTERNAL CAVITY OF MEDICAL SIMULATOR AND INTEGRATING SIMULATION DATA

(75) Inventor: Charles G. Miller, Allison Park, PA (US)

(73) Assignee: KbPort LLC, Allison Park, PA (US)

( * ) Notice: Subject to any disclaimer, the term of this patent is extended or adjusted under 35 U.S.C. 154(b) by 1898 days.

(21) Appl. No.: 12/648,160

(22) Filed: Dec. 28, 2009

(65) Prior Publication Data

US 2010/0167252 A1    Jul. 1, 2010

Related U.S. Application Data

(60) Provisional application No. 61/140,915, filed on Dec. 26, 2008.

(51) Int. Cl.
*G09B 23/30*    (2006.01)
(52) U.S. Cl.
CPC ..................................... *G09B 23/30* (2013.01)
(58) Field of Classification Search
CPC ...................................................... G09B 23/30
USPC ................................ 434/262, 267, 272, 274
See application file for complete search history.

(56) References Cited

U.S. PATENT DOCUMENTS

| 3,520,071 A | 7/1970 | Abrahamson et al. |
| 4,360,345 A | 11/1982 | Hon |
| 5,403,192 A | 4/1995 | Kleinwaks et al. |
| 5,472,345 A | 12/1995 | Eggert |
| 5,853,292 A | 12/1998 | Eggert et al. |
| 5,900,923 A | 5/1999 | Prendergast et al. |
| 5,941,710 A | 8/1999 | Lampotang et al. |
| 6,193,519 B1 | 2/2001 | Eggert et al. |
| 6,428,323 B1 | 8/2002 | Pugh |
| 6,443,735 B1 | 9/2002 | Eggert et al. |
| 6,503,087 B1 | 1/2003 | Eggert et al. |
| 6,527,558 B1 | 3/2003 | Eggert et al. |
| 6,535,714 B2 | 3/2003 | Melker et al. |
| 6,758,676 B2 | 7/2004 | Eggert et al. |
| 7,114,954 B2 | 10/2006 | Eggert et al. |
| 7,192,284 B2 | 3/2007 | Eggert et al. |
| 7,465,168 B2 | 12/2008 | Allen et al. |
| 2001/0016804 A1* | 8/2001 | Cunningham et al. ........... 703/7 |
| 2005/0064378 A1* | 3/2005 | Toly ............................... 434/262 |
| 2005/0084833 A1* | 4/2005 | Lacey et al. .................. 434/262 |
| 2007/0041660 A1* | 2/2007 | Mahesh et al. ............... 382/294 |
| 2007/0166681 A1* | 7/2007 | Hemphill et al. ............ 434/262 |
| 2007/0166682 A1* | 7/2007 | Yarin et al. .................... 434/267 |

(Continued)

*Primary Examiner* — Bruk Gebremichael
(74) *Attorney, Agent, or Firm* — Buchanan Ingersoll & Rooney PC

(57) ABSTRACT

A method and apparatus for illuminating and recording an internal cavity of a medical simulator and integrating simulator data is disclosed. An apparatus for illuminating and recording an internal cavity of a medical simulator and integrating simulator data comprising: at least one light source configured for illuminating the internal cavity with light outside of the visible spectrum during an operator session, at least one video camera having a field of vision including at least part of the internal cavity for video recording an operator session; and a synchronizing system receiving and storing the at least one video recording of the at least one video camera and the at least one data output of the medical simulator.

10 Claims, 3 Drawing Sheets

(56) References Cited

U.S. PATENT DOCUMENTS

2008/0124694 A1    5/2008  Miller et al.
2008/0145830 A1*   6/2008  Huang et al. .................. 434/336
2009/0311655 A1*  12/2009  Karkanias et al. ........... 434/262

* cited by examiner

FIG. 3
FIG. 4
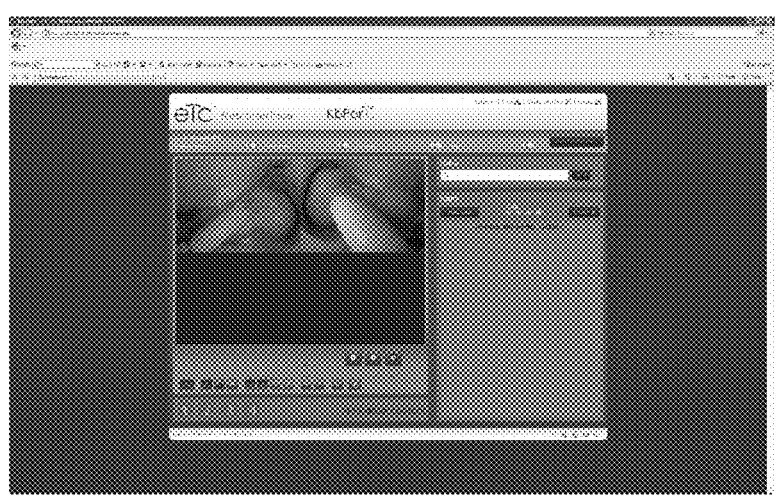
FIG. 5

METHOD AND APPARATUS FOR ILLUMINATION AND RECORDING OF INTERNAL CAVITY OF MEDICAL SIMULATOR AND INTEGRATING SIMULATION DATA

CROSS REFERENCE TO RELATED APPLICATIONS

The present application claims the benefit of U.S. provisional patent application Ser. No. 61/140,915, entitled "Method and Apparatus for Illuminating and Recording an Internal Cavity of a Medical Simulator and Integrating Simulator Data" filed Dec. 26, 2009.

BACKGROUND OF THE INVENTION

1. Field of the Invention

This invention relates generally to education of medical professionals using medical simulators, more specifically to a method and apparatus for illuminating and recording an internal cavity of a medical simulator and integrating simulator data.

2. Background Information

I. Medical Simulator Background

It is highly desirable to train students in patient care protocols and proper use of specific medical devices before allowing contact with real patients. However, textbooks and flash cards lack the important benefits to students that can be attained from "hands-on" practice. Actual patients for such hands on training pose some difficulties, as can be expected. The training of medical personnel in the art of gynecological techniques or child-birthing, for example, is hampered by the unavailability of live patients willing to be practiced on and the undesirability of allowing untrained personnel from performing life-affecting, and possibly life-threatening, medical procedures.

Thus, patient care education has, in recent years, often been taught using devices, such as a manikin configured to simulate a patient, commonly called "medical simulators", "patient simulators", and "patient mannequins", and "robotic patients" as well as simply "simulators" and "mannequins" (in context).

The presently available patient simulator mannequins provide "hands-on" training to medical personnel in areas such as trauma treatment, anesthesiology, gynecological examination, childbirth, and a host of other medical simulator specific procedures. These mannequins typically have significant physiologic mimicking capabilities. Various medical devices can be attached to these mannequins to train users in the proper implementation and use. These mannequins are often computer controlled and are programmed for a variety of responses which simulate medical conditions.

Using patient simulator mannequins, the students, nurses, medical personnel, etc. can learn medical protocols and develop skills in manual dexterity and proper placement of leads, tubes, etc. without risk to live patients.

One gynecological medical simulator, known as ZOE™ brand product, is disclosed in U.S. Pat. No. 5,472,345 and this is incorporated herein by reference. While this design has been described as an excellent model of a human female pelvis, it presents a few problems for the instructor as discussed in further detail below.

U.S. Pat. No. 7,465,168, incorporated herein by reference, owned by Birth Injury Prevention, LLC of Baltimore, Md. discloses a birthing simulator. Birthing is one physiological process that is useful to simulate. For instance, while the birthing process itself is a natural process that often concludes without complications, even in an uncomplicated birth, inaccurate obstetric procedure can cause injury to the fetus and to the mother. Moreover, while many births occur without complications, some births do not. Of the different types of complications that may occur, a number of them represent potentially life-threatening obstetric emergencies. Birthing simulators allow clinicians and researchers to research and train for complications and obstetric emergencies without risking fetal or maternal injury.

One approach to the use of patient mannequins was taken in U.S. Pat. No. 5,853,292, which is incorporated herein by reference, which discloses using sensor-equipped "virtual" instruments interfaced with a patient simulator through a computer interface module.

U.S. Pat. No. 6,535,714 relates to medical device training including providing for documentation of competency during the training exercise. This patent is incorporated herein by reference.

U.S. Pat. No. 6,428,323 discloses a system for teaching students and health care professionals medical examinations performed manually inside a body cavity or anatomical space. This patent is incorporated herein by reference.

U.S. Pat. No. 4,360,345, which is incorporated herein by reference, discloses a further simulator system for teaching cardiopulmonary resuscitation (CPR) and other basic physiological procedures. Gaumard Scientific Company, Inc. (Gaumard) of Miami, Fla. has developed a variety of medical simulators that are representative of the state of the art in medical simulators. Gaumard first introduced a basic childbirth simulator in 1949 and has over half a century of experience in the simulator field. The currently available NOELLE™ brand birthing simulator from Gaumard is a pregnant robotic simulator used in increasing numbers of medical schools and hospital maternity wards.

Further medical simulators and related devices described in U.S. Pat. Nos. 7,192,284; 7,114,954; 6,758,676; 6,527,558; 6,503,087; 6,503,087; 6,443,735; 6,193,519; 5,853,292 (discussed above); and 5,472,345 that are assigned to Gaumard. These patents are incorporated herein by reference.

Other examples of such patient mannequins are disclosed in U.S. Pat. Nos. 5,941,710; 5,900,923; 5,403,192; and 3,520,071, the disclosures of which are incorporated herein by reference.

The SIMMAN™ brand product is a portable and advanced patient simulator for team training in the emergency treatment of patients. The device is from Laerdal Medical, Inc. (Laerdal). The SIMMAN™ patient simulator has a realistic anatomy and clinical functionality and provides simulation-based education through realistic patient care scenarios. Laerdal further provides a PROMPT™ brand birthing simulator.

The Eagle Patient Simulator, developed by David Gaba, Md., and others, at Stanford University, and marketed by MedSim, Inc. of Ft. Lauderdale, Fla., connects to an interface cart that drives the mannequin's electromechanical functions. The cart also serves as the interface for conventional monitoring equipment found in the operating room.

The G. S. Beckwith Gilbert and Katharine S. Gilbert Medical Education Program in Medical Simulation is a resource for all Harvard Medical School students and faculty. The Gilbert Program integrated learning labs are each equipped with a realistic mannequin patient simulator, a seminar table with whiteboard, and a web-connected plasma display. This unified learning lab brings together traditional teaching and web-based information technology all at the bedside of a simulated patient. The mission of the G. S.

Beckwith Gilbert and Katharine S. Gilbert Medical Education Program is to "bring to life" good teaching cases for medical students of all levels using high-fidelity patient simulation to foster experiential learning in a safe environment"

II. Recorded Medical Simulator Sessions

The realism of the patient simulators represents only one portion of the entire medical patient simulator educational experience. It is common for the simulation events to be monitored and even recorded, typically on video-tape or via a hand held video recorder, for peer or teacher review. This critical review and feedback of a session is as important of a teaching tool as is the simulation itself.

In such analysis and feedback of given simulation sessions, the trainees can have mistakes pointed out and corrected. Conventionally this entails that the entire event is recorded on a camera for playback. The recording of the event is particularly useful in simulations where there are multiple participants, i.e. a "team" of participants, that may have overlapping spheres of influence, and the event recording is the only effective review of the team interaction to review how the team worked together. The simulator itself will often have a recording of the changes in all of the particular simulated physiologic parameters of the simulator (i.e. the data output) over the time of the session for latter analysis, whereby there is an objective review of the session on the simulator (e.g., how did the simulated patient do throughout the event).

The data output record of a session alone does not provide adequate information as to why a particular patient result was achieved in a session, particularly in a team participant environment with overlapping areas of influence relative to the simulated physiologic parameters of the simulator. A video and an audio recording of the event does add the ability to review why a particular result was or was not achieved in a session with the patient simulator.

In 2003, the Peter M. Winter Institute for Simulation, Education and Research (WISER), a simulation center located at the University of Pittsburgh Medical Center (UPMC), attempted to utilize the Laerdal SIMMAN™ Simulator to generate Extensible Markup Language (XML) performance logs of simulation sessions that could then be utilized to correlate with a digital primary video file. The digital video recording was stored on a central server with playback made available over the Internet via a standard web browser. The time stamp on the performance log was attempted to be utilized as an index mechanism for the primary video file. This early synchronizing system never proved to be effective in practice, however, and the attempted integration was not sufficient to be a meaningful tool for students. The proposed system did not offer independent control over various inputs.

KB Port, LLC. (KB Port) of Pittsburgh, Pa. currently provides a system for effectively synchronizing the video, audio recordings and data log files for analysis and for playback (feedback). The KB Port ETC™ brand system can take multiple video and audio input signals and effectively synchronize these with multiple data inputs of medical simulators for integrated playback. The 2008 version of the ETC™ product provides a seamless integration of video and audio and data inputs and it is this system that is particularly helpful in implementing the aspects of the present invention as described below. The operating aspects of the ETC™ product are described in U.S. Patent Publication No. 2008-0124694 which is incorporated herein by reference.

Within the meaning of this application, the ETC™ system is a type of synchronizing system, wherein a synchronizing system is a system that can receive a variety of independent time based inputs, including audio and visual inputs, for storage and provide for playback of the inputs in an integrated, synchronized manner.

III Visual Observation of Internal Cavity of Medical Simulators

It has been noted that there exists a problem with medical techniques performed in internal cavities of medical simulators. For example in discussing the drawbacks of the simulator disclosed in U.S. Pat. No. 5,472,345, the hands of the person performing the exam on the simulator are not visible to an observer; a student watching an instructor does not obtain a clear picture of basic internal exam technique, nor is an instructor able to accurately judge a student's performance. Some simulators thus have been designed with a transparent region to allow viewing of the internal region, or even a cut-away portion to show the internal cavity. The provision of a transparent portion or cut-away portion of a manikin eliminates some of the realism of the manikin, allowing the students to practice with a field of view not afforded them in real life. Even with a cut-away or transparent region or suitable internal lighting, the simulator cannot significantly overcome the problem of limited visibility. Without detailed feedback, the student may not learn the essential elements of the exam or may develop improper technique. Unfortunately, the prevailing attitude in medical schools is that this type of manual exam is eventually learned through experience, and educators tend to tolerate the above problems.

In addressing the deficiencies of U.S. Pat. Nos. 5,472,345, 6,428,323, both of which are incorporated herein by reference, discloses the use of a variety of internal sensors that give some type of feedback of the trainee's performance of a given medical procedure (i.e. gynecological examination) within an internal cavity of the medical simulator. U.S. Pat. No. 6,428,323 suggests that earlier medical simulator systems do not provide information on exams performed manually inside body cavities of the simulators, and thus there was no efficient means for assessing exam performance.

As noted above, in an attempt to partially address these concerns, medical simulators have provided internal cavities with transparent sections or removable covers (also called cut-away sections) to allow for direct viewing of the now opened cavity and recording of the same with external video cameras. This has been helpful to begin to prepare the students in particular procedures or medical protocols, but it allows the students an increased visibility that is not present in the actual procedure and can be detrimental in learning proper protocols as the students improperly rely upon the visualization of the cavity that is provided on in these simulators.

There remains a need in the industry to provide an unobtrusive video recording of an internal cavity of medical simulator and to integrate such recording with other data from the simulator. There is a further need to address the deficiencies of the prior art in a cost effective manner.

SUMMARY OF THE INVENTION

At least some of the above objects are achieved with a method and apparatus for illuminating and recording an internal cavity of a medical simulator and integrating simulator data in accordance with the present invention. In one non-limiting aspect of the present invention, the invention provides a method for illuminating and recording an internal cavity of a medical simulator and integrating simulator data comprising the steps of: (a) providing a medical simulator having an internal cavity with operator activity normally occurring within the internal cavity during a session; (b) creating at least one data output from the simulator associated with an operator session; (c) illuminating the internal cavity with light outside of the visible spectrum during an operator session; (d) video recording an operator session on at least one video camera having a field of vision including at least part of the internal cavity; and receiving and storing the at least one video recording of step (d) and the at least one data output of step (b) in a synchronizing system.

In some non-limiting aspects of the invention each internal cavity video camera is positioned outside of the boundary of the internal cavity. Further, a camera aperture may be provided in the boundary of the internal cavity for each internal cavity video camera, with each internal cavity video camera mounted adjacent one camera aperture.

In one non-limiting aspect of the invention at least two internal cavity video cameras are provided which further have opposing views of the internal cavity.

In one non-limiting aspect of the invention the illuminating of the internal cavity with light outside of the visible spectrum during an operator session uses infrared lighting, and wherein the infrared lighting may include at least one infrared light source positioned outside of the boundary of the internal cavity. Further, each infrared light source may be configured to diffuse through the boundary of the internal cavity. Additionally, the illuminating of the internal cavity with light outside of the visible spectrum during an operator session may use an array of infrared LED light sources.

In one non-limiting aspect of the invention the simulator is a child birthing medical simulator.

A non-limiting aspect of the present invention provides an apparatus for illuminating and recording an internal cavity of a medical simulator and integrating simulator data, said apparatus comprising: at least one light source configured for illuminating the internal cavity with light outside of the visible spectrum during an operator session; at least one video camera having a field of vision including at least part of the internal cavity for video recording an operator session; and a synchronizing system receiving and storing the at least one video recording of the at least one video camera and the at least one data output of the medical simulator.

The advantages of the present invention will be clarified in the description of the preferred embodiments taken together with the attached figures in which like reference numerals represent like elements throughout.

BRIEF DESCRIPTION OF THE DRAWINGS

Other objects and advantages appear in the following description and claims. The enclosed drawings illustrate some practical embodiments of the present invention, without intending to limit the scope of the invention or the included claims.

FIGS. 3-5 are screenshots illustrating the video images of the internal cavity of the medical simulator of FIG. 2 obtained with the apparatus of FIG. 1.

DETAILED DESCRIPTION OF THE PREFERRED EMBODIMENTS

Figure 1:
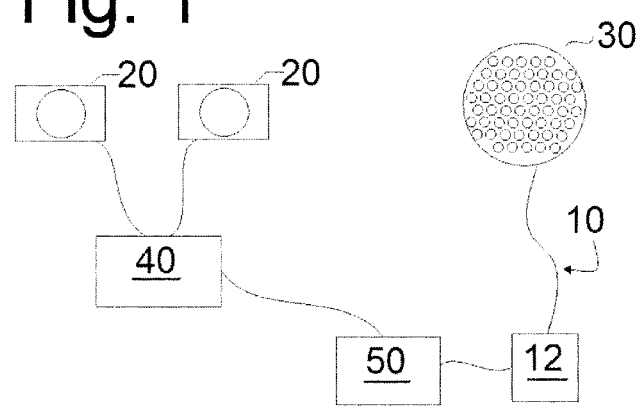
FIG. 1 is a schematic view of an apparatus for illuminating and recording an internal cavity of a medical simulator and integrating simulator data in accordance with a first embodiment of the present invention.
Figure 2:
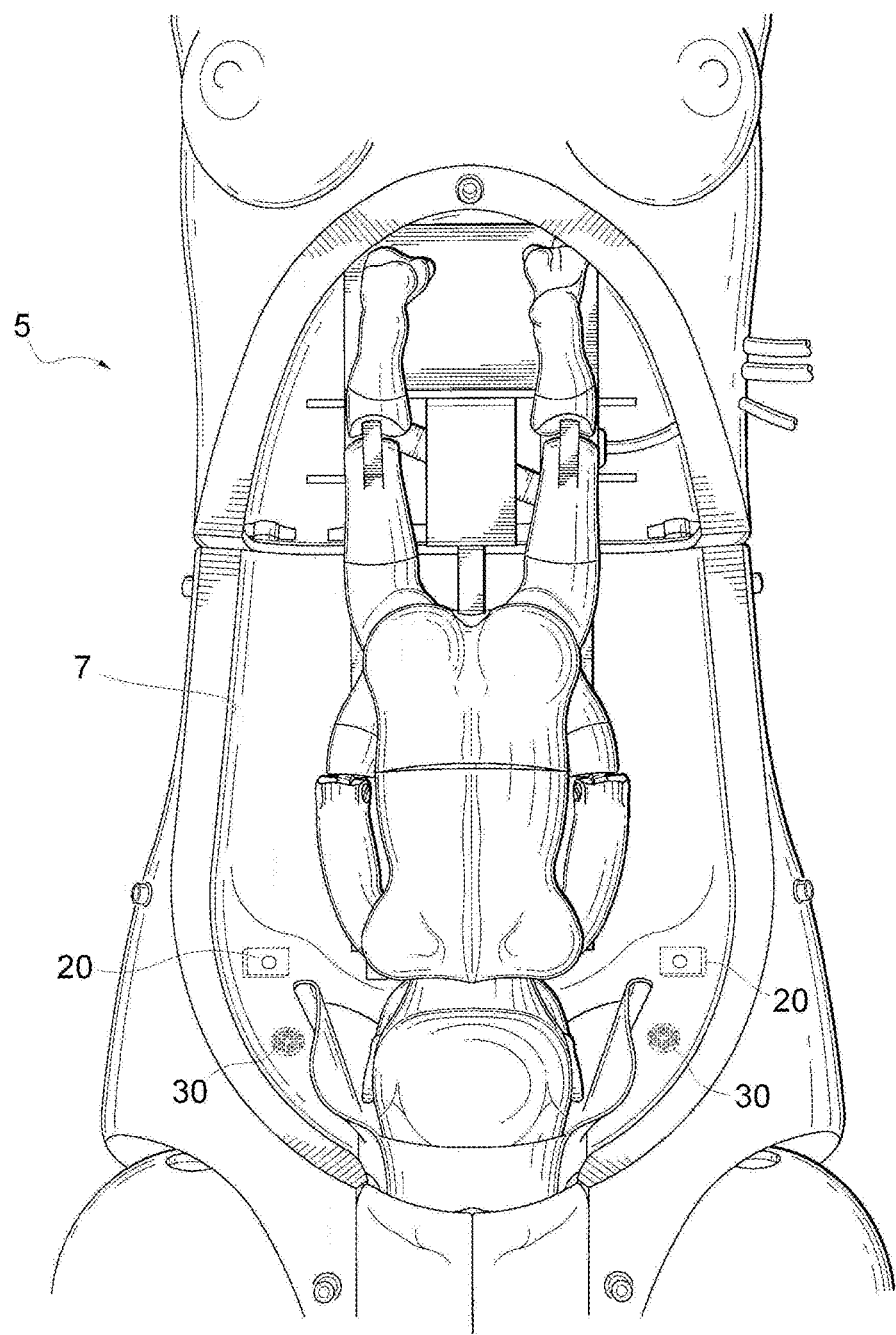
FIG. 2 is a schematic top plan view of a medical simulator having an internal cavity, with the cover thereof removed solely for purposes of illustration, together with components of the apparatus for illuminating and recording the internal cavity of FIG. 1.

As will be described in greater detail below the present invention provides an apparatus 10 and associated method for illuminating and recording an internal cavity 7 of a medical simulator 5 and integrating simulator data in accordance, as shown in FIGS. 1 and 2. In summary the apparatus 10 for illuminating and recording an internal cavity 7 of a medical simulator 5, such as a birthing simulator as shown in FIG. 2, and integrating simulator data comprises: at least one light source 30 configured for illuminating the internal cavity 7 with light outside of the visible spectrum (e.g., infrared light) during an operator session; at least one video camera 20 having a field of vision including at least part of the internal cavity 7 for video recording an operator session; and a synchronizing system 40 receiving and storing the at least one video recording of the at least one video camera and the at least one data output of the medical simulator.

In will be helpful to define several terms and phrases used throughout this application, such that the precise scope, content and context of the present invention can be easily and accurately described. Within the meaning of this application, a synchronizing system 40 is a system that can receive a variety of independent time based inputs, including audio and visual inputs, for storage and provide for playback of the inputs in an integrated, synchronized manner. A representative example of a synchronizing system 40 is the 2008 version of the ETC™ brand system from KB Port of Pittsburgh Pa.

Within the meaning of this application a simulator 5 is referencing a medical simulator 5, which is also called a patient simulator, patient mannequin, and robotic patient in the art. Representative examples of such simulators that are commercially available as of the time of filing this application include the NOELLE™ brand birthing simulator from Gaumard, the SIMMAN™ and PROMPT™ brand Simulators from Laerdal, the Eagle Patient Simulator marketed by MedSim, Inc. of Ft. Lauderdale, Fla., and the ZOE™ brand simulator product which were briefly discussed above.

Within the meaning of the present application an internal cavity 7 represents an interior portion of a simulator 5 that is partially or completely obstructed from the user's view in at least one normal operation. Representative examples of an internal cavity 7 of a simulator 5 include the simulated birthing canal and womb of a birthing simulator, the internal cavities of a gynecological simulator, heart chambers for a heart simulator, the windpipe of an intubations simulator (more generally an emergency care simulator), and the abdomen and chest cavities of numerous simulators. This listing is certainly not exhaustive and is intended to be illustrative only.

Within the meaning of this application an internal cavity video camera 20 is a video camera mounted such that the camera 20 has a field of vision (i.e. camera view) including at least part of an internal cavity 7 of a medical simulator 5.

The simulator 5 can be one of many simulators having a non-visible (to the operator) interior cavity 7. Specifically in the figures the simulator 5 is the NOELLE™ brand birthing simulator from Gaumard and the interior cavity 7 of interest is the simulated abdominal cavity. It is noted that the cavity 7 of this particular simulator 5 comes with a removable cover (not shown in FIG. 2 for clarity). The apparatus 10 of the present invention is certainly operable when the cover is removed as shown and the cavity 7 is an "open cavity, but the present invention would not provide substantively better video results than external video cameras such as may be mounted above the operating table. It is when the cover is attached that the cavity 7 becomes an internal cavity 7 within the meaning of this application and the present invention provides truly meaningful results. With the cover attached the simulator 5 is operating in a more realistic mode of operation and it is here that the synchronized recording of the internal cavity 7 is possibly most desirable.

The apparatus 10 is usable with other simulators 5, such as the SIMMAN™ and PROMPT™ brand Simulators from Laerdal, the Eagle Patient Simulator marketed by MedSim, Inc. of Ft. Lauderdale, Fla., and the ZOE™ brand simulator product which were briefly discussed above. The illustrated simulator 5 is intended to be illustrative of the present invention.

As shown in the specific embodiment the apparatus 10 includes a pair of video cameras 20 each having a field of vision including at least part of the internal cavity 7 for video recording an operator session. Each camera 20 is a modified USB Web cam utilizing a non-infrared filtered lens with an appropriate lens mount. A 2.2 mm lens has proven effective in the present invention. Optional lenses may be provided, such as a custom fiber lens.

In the embodiment shown, each internal cavity video camera 20 is positioned outside of a boundary of the internal cavity 7, wherein there is a small camera aperture in the boundary of the internal cavity 7 for each internal cavity video camera 20. Each internal cavity video camera 20 is mounted adjacent one camera aperture. In this manner the cameras 20 are effectively flush with the boundary of the internal cavity 7 and positioned to not obstruct the operation of the simulator 5 or distract the user such as when the user views the interior cavity 7 through an appropriate scope during a session.

Although a wide variety of camera positions are possible, the two internal cavity video cameras 20 as shown each have opposing views of the internal cavity 7, meaning they are on opposite sides of the internal cavity 7. The opposing view positioning allows for a comprehensive view of the session to be assembled via the synchronizing system 40.

Within the camera mounting, a spring may be provided between the camera body and the outer end of the lens to maintain pressure so that the lens focus does not change, while still allowing for end user to adjust focus, if needed. Alternatively, the camera lens can be glued in place to avoid any change if so desired. Other mounting arrangement can be provided as generally known in the video arts.

Any analog or digital camera can be utilized for camera 20, but a digital USB camera connects directly into the MICRO-ETCT™ recorder of the ETC™ brand synchronizing system 40 where it receives its power and transfers its data, namely video and audio outputs.

At least one light source 30 configured for illuminating the internal cavity 7 with light outside of the visible spectrum is provided. Each light source 30 may be an Infrared illuminator 30 which is used on the outside of the boundary of the internal cavity 7. The boundary may in some context be referenced as the simulator's skin. As shown in this embodiment, each light source 30 is placed inside of the simulator 5 between the inner shell that defines the inner cavity 7 and outer shell defining the simulated exterior of the patient. This position of the lighting sources 30 outside of the internal cavity is helpful so that the student/user does not see the lighting hardware during a session. The light source can also be placed on the complete outside of the simulator 5.

Further the boundary material (e.g. the simulator's skin) can act a diffuser to diffuse the light to more evenly illuminate the internal cavity 7 and prevent hot spots from the lighting source 30 showing up on the video data. Reflecting the IR light from the source 30 into the cavity 7 may also be used to diffuse the light to more evenly cover a larger area and to eliminate so called hotspots {concentrated light spots} in the video data.

Most internal type cameras and scopes used by medical professionals operate with reflective and fiber optic lighting that will not be able to detect the infrared light when practicing procedures, therefore the lighting sources 30 maintain the realism of the simulation.

Each light source 30 may be an array of infrared LED light sources, as shown. The number of light sources 30 and position of light sources 30 can be selected to adequately and relatively evenly illuminate the interior cavity 7 for the video images. Alternative arrangements are possible, such as a series of individual LED elements throughout the interior cavity 7. Each light source 30 will be controlled, directly or indirectly, through the synchronizing system 40. For example the light sources 30 may receive instructions through the cameras 20. The control can be to adjust illumination as well as to selectively turn off and on.

The apparatus 10 includes a synchronizing system 40 receiving and storing the at least one video recording of the at least one video camera and the, at least one, data output of the medical simulator 5. The synchronizing system 40 can receive a variety of independent time based inputs, including audio and visual inputs, for storage and provide for playback of the inputs in an integrated, synchronized manner. The ETC™ brand system from KB Port of Pittsburgh Pa. serves as an effective synchronizing system 40 for the present invention.

In addition to the visual and audio inputs received from the cameras 20 of the invention, the synchronizing system 40 receives the data inputs from the simulator 5. The data inputs from the simulator 5 are generally the simulated physiologic parameters of the simulated patient during the session. The specific representations of each data output varies between the different simulators and can vary between brands of the same class of simulator. The ETC™ brand synchronizing system 40 is configured to accept a wide variety and large number of such inputs. Further, for any data input that is not in a format acceptable for the standard inputs received, a separate digital conversion component can be designed for that output to place it in an acceptable format for the ETC™ brand system 40. It is possible for the data inputs of the simulator 5 to be generated by particular medical tools (or tool simulators) used with the simulator 5.

In addition to the visual and audio inputs received from the cameras 20 of the invention, the synchronizing system 40 could receive video and/or audio inputs from external cameras and microphones to completely record the aspects of the session. For example, the synchronizing system 40 will also accept video inputs such as one or more cameras over the operating table. The integration of these conventional external video cameras is well known to those users of the ETC™ brand system, which represents a primary function of the ETC™ brand system.

Further, it is possible to use the apparatus 10 of the present invention with a simulator 5 having no data outputs. Such simulators are simple representations of the desired mechanical physiology. In such case the synchronizing system 40 may only need to synchronize the video and audio inputs alone from cameras 20 and external cameras and microphones, if any.

Other electronic components 50, such as a voltage regulator or power supply or analog to digital converter (for analog cameras 20), may be incorporated into the system 10 to complete the operational system. These additional electronic components will be known to those of ordinary skill in the art and are not described herein in detail.

FIGS. 3-5 are screenshots from the ETC™ brand synchronizing system 40 illustrating the video images of the internal cavity 7 of the medical simulator 5 of FIG. 2 obtained with the cameras 20.

The operation of the invention described is straightforward. The method for illuminating and recording the internal cavity 7 of the medical simulator 5 and integrating simulator data comprises the steps of: (a) providing a medical simulator 5 having an internal cavity 7 with operator activity normally occurring within the internal cavity 7 during a session; (b) creating at least one data output from the simulator 5 associated with an operator session; (c) illuminating the internal cavity 7 with light from source 30 outside of the visible spectrum during an operator session; (d) video recording an operator session on at least one video camera 20 having a field of vision including at least part of the internal cavity 7; and (e) receiving and storing the at least one video recording of step (d) and the at least one data output of step (b) in a synchronizing system 40.

The present invention has been described with reference to specific details of particular embodiments thereof. It is not intended that such details be regarded as limitations upon the scope of the invention. It will be apparent that various modifications can be made without departing from the spirit and scope of the present invention. For example, the lighting source 30 may include selectively actuated visible and non-visible light to selectively illuminate the interior. It may be desirable to use a visible light for beginning students before increasing the realism of the simulator to use only the infrared light. The precise scope of the invention is to be defined by the appended claims and equivalents thereto.

What is claimed is:

1. A method for illuminating and recording an internal cavity of a medical simulator for a simulated patient and integrating simulator data comprising the steps of:
   A) providing a medical simulator having an internal cavity with operator activity normally occurring within the internal cavity during a session;
   B) creating at least one data output from the simulator associated with an operator session, wherein the at least one data output includes simulated physiologic parameters of the simulated patient;
   C) illuminating the internal cavity with light outside of the visible spectrum during an operator session;
   D) video recording an operator session on at least one video camera having a field of vision including at least part of the internal cavity; and
   E) receiving and storing the at least one video recording of step D) and the at least one data output of step B) in a synchronizing system which can provide playback of each video recording and each data output in an integrated synchronized manner,
   wherein the illuminating of the internal cavity with light outside of the visible spectrum during an operator session uses infrared lighting,
   wherein the infrared lighting includes at least one infrared light source positioned outside of the boundary of the internal cavity, and
   wherein the at least one infrared light source is configured to diffuse through a boundary membrane that defines the boundary of the internal cavity.

2. The method of claim 1, wherein each video camera having a field of vision including at least part of the internal cavity is positioned outside of the boundary of the internal cavity.

3. The method of claim 2, wherein there is a camera aperture in the boundary of the internal cavity for each video camera having a field of vision including at least part of the internal cavity, with each video camera having a field of vision including at least part of the internal cavity is mounted adjacent one camera aperture.

4. The method of claim 1, wherein the illuminating of the internal cavity with light outside of the visible spectrum during an operator session uses an array of infrared LED light sources and wherein the simulator is a child birthing medical simulator.

5. A method for illuminating and recording an internal cavity of a medical simulator for a simulated patient and integrating simulator data comprising the steps of:
   A) providing a medical simulator having an internal cavity with operator activity normally occurring within the internal cavity during a session;
   B) creating at least one data output from the simulator associated with an operator session, wherein the at least one data output includes simulated physiologic parameters of the simulated patient;
   C) illuminating the internal cavity with light outside of the visible spectrum during an operator session;
   D) video recording an operator session on at least one video camera having a field of vision including at least part of the internal cavity; and
   E) receiving and storing the at least one video recording of step D) and the at least one data output of step B) in a synchronizing system which can provide playback of each video recording and each data output in an integrated synchronized manner,
   wherein each video camera having a field of vision including at least part of the internal cavity is positioned outside of the boundary of the internal cavity,
   wherein there is a camera aperture in the boundary of the internal cavity for each video camera having a field of vision including at least part of the internal cavity, with each video camera having a field of vision including at least part of the internal cavity is mounted adjacent one camera aperture,
   wherein there are at least two video cameras each having a field of vision including at least part of the internal cavity and which further have opposing views of the internal cavity,
   wherein the illuminating of the internal cavity with light outside of the visible spectrum during an operator session uses infrared lighting,
   wherein the infrared lighting includes at least one infrared light source positioned outside of the boundary of the internal cavity, and
   wherein the at least one infrared light source is configured to diffuse through a boundary membrane that defines the boundary of the internal cavity.

6. A method for illuminating and recording an internal cavity of a medical simulator for a simulated patient and integrating simulator data comprising the steps of:
   A) providing a medical simulator having an internal cavity with operator activity normally occurring within the internal cavity during a session;
   B) creating at least one data output from the simulator associated with an operator session, wherein the at least one data output includes simulated physiologic parameters of the simulated patient;

C) illuminating the internal cavity with light outside of the visible spectrum during an operator session;

D) video recording an operator session on at least one video camera having a field of vision including at least part of the internal cavity; and E) receiving and storing the at least one video recording of step D) and the at least one data output of step B) in a synchronizing system which can provide playback of each video recording and each data output in an integrated synchronized manner, wherein each video camera having a field of vision including at least part of the internal cavity is positioned outside of the boundary of the internal cavity, wherein there is a camera aperture in the boundary of the internal cavity for each video camera having a field of vision including at least part of the internal cavity, with each video camera having a field of vision including at least part of the internal cavity is mounted adjacent one camera aperture, wherein there are at least two video cameras each having a field of vision including at least part of the internal cavity and which further have opposing views of the internal cavity, wherein the illuminating of the internal cavity with light outside of the visible spectrum during an operator session uses infrared lighting, wherein the infrared lighting includes at least one infrared light source positioned outside of the boundary of the internal cavity, and wherein a plurality of infrared light sources are provided and each are configured to diffuse through a boundary membrane that defines the boundary of the internal cavity.

7. A method for illuminating and recording an internal cavity of a medical simulator for a simulated patient and integrating simulator data comprising the steps of:

A) providing a medical simulator having an internal cavity with operator activity normally occurring within the internal cavity during a session;

B) creating at least one data output from the simulator associated with an operator session, wherein the at least one data output includes simulated physiologic parameters of the simulated patient;

C) illuminating the internal cavity with light outside of the visible spectrum during an operator session;

D) video recording an operator session on at least one video camera having a field of vision including at least part of the internal cavity; and E) receiving and storing the at least one video recording of step D) and the at least one data output of step B) in a synchronizing system which can provide playback of each video recording and each data output in an integrated synchronized manner, wherein the illuminating of the internal cavity with light outside of the visible spectrum during an operator session uses infrared lighting, wherein the infrared lighting includes at least one infrared light source positioned outside of the boundary of the internal cavity, and wherein a plurality of infrared light sources are provided and each are configured to diffuse through a boundary membrane that defines the boundary of the internal cavity.

8. A method for illuminating an internal cavity of a medical simulator comprising the steps of:

A) providing a medical simulator having an internal cavity with operator activity normally occurring within the internal cavity during a session;

B) illuminating the internal cavity with light outside of the visible spectrum during an operator session and wherein the light is positioned outside of the boundary of the internal cavity and configured to diffuse through a boundary membrane that defines the boundary of the internal cavity; and C) video recording an operator session on at least one video camera having a field of vision including at least part of the internal cavity.

9. An apparatus for illuminating and recording an internal cavity of a medical child birthing simulator forming a simulated birthing canal and womb of a simulated patient and integrating simulator data, said apparatus comprising:

at least one light source configured for illuminating the internal cavity forming the simulated birthing canal and womb of the simulated patient with light outside of the visible spectrum during an operator session;

creating at least one data output from the medical child birthing simulator associated with an operator session, wherein the at least one data output includes simulated physiologic parameters of the simulated patient;

at least one video camera having a field of vision including at least part of the internal cavity forming the simulated birthing canal and womb of the simulated patient for video recording an operator session; and a synchronizing system receiving and storing the at least one video recording of the at least one video camera and the at least one data output of the medical simulator which can provide playback of each video recording and each data output in an integrated synchronized manner, wherein there is a camera aperture in the boundary of the internal cavity for each video camera having a field of vision including at least part of the internal cavity, with each video camera having a field of vision including at least part of the internal cavity is mounted adjacent one camera aperture, wherein there are at least two video cameras each having a field of vision including at least part of the internal cavity and which further have opposing views of the internal cavity, wherein the light source uses infrared lighting and is positioned outside of a boundary membrane that defines the boundary of the internal cavity, and wherein the at least one infrared light source is configured to diffuse through a boundary membrane that defines the boundary of the internal cavity.

10. An apparatus for illuminating and recording an internal cavity of a medical child birthing simulator forming a simulated birthing canal and womb of a simulated patient and integrating simulator data, said apparatus comprising:

at least one light source configured for illuminating the internal cavity forming the simulated birthing canal and womb of the simulated patient with light outside of the visible spectrum during an operator session;

creating at least one data output from the medical child birthing simulator associated with an operator session, wherein the at least one data output includes simulated physiologic parameters of the simulated patient;

at least one video camera having a field of vision including at least part of the internal cavity forming the simulated birthing canal and womb of the simulated patient for video recording an operator session; and a synchronizing system receiving and storing the at least one video recording of the at least one video camera and the at least one data output of the medical simulator which can provide playback of each video recording and each data output in an integrated synchronized manner, wherein there is a camera aperture in the boundary of the internal cavity for each video camera having a field of vision including at least part of the internal cavity, with each video camera having a field of vision including at least part of the internal cavity is mounted adjacent one camera aperture, wherein there are at least two video cameras each having a field of vision including at least part of the internal cavity and which further have opposing views of the internal cavity, wherein the light source uses infrared lighting and is positioned outside of a boundary membrane that defines the boundary of the internal cavity, and wherein a plurality of infrared light sources are provided and each are configured to diffuse through a boundary membrane that defines the boundary of the internal cavity.

* * * * *